(12) United States Patent
Von Bueren (10) Patent No.: US 10,877,054 B2
(45) Date of Patent: Dec. 29, 2020

(54) SPECIMEN SLIDE HAVING SEVERAL BARCODES

(71) Applicant: Sakura Finetek U.S.A., Inc., Torrance, CA (US)

(72) Inventor: Erico Von Bueren, Rolling Hills Estates, CA (US)

(73) Assignee: Sakura Finetek U.S.A., Inc., Torrance, CA (US)

( * ) Notice: Subject to any disclaimer, the term of this patent is extended or adjusted under 35 U.S.C. 154(b) by 237 days.

(21) Appl. No.: 15/961,784

(22) Filed: Apr. 24, 2018

(65) Prior Publication Data

US 2019/0324048 A1 Oct. 24, 2019

(51) Int. Cl.
*G01N 1/00* (2006.01)
*G01N 35/00* (2006.01)
*G01N 1/28* (2006.01)

(52) U.S. Cl.
CPC ......... *G01N 35/00732* (2013.01); *G01N 1/28* (2013.01); *G01N 35/00029* (2013.01); *G01N 2035/00752* (2013.01)

(58) Field of Classification Search
CPC ........................................ G01N 1/00
See application file for complete search history.

(56) References Cited

U.S. PATENT DOCUMENTS

| 2010/0073766 A1* | 3/2010 | Angros | .................. B01L 3/545 |
| | | | 359/397 |
| 2015/0169555 A1 | 6/2015 | Wrenn et al. | |
| 2015/0211964 A1* | 7/2015 | Stocker | .................. B01L 9/523 |
| | | | 435/7.1 |

FOREIGN PATENT DOCUMENTS

| JP | 2002533695 A | 10/2002 |
| JP | 2009520186 A | 5/2009 |
| JP | 2015533232 A | 10/2015 |
| WO | 2007078842 | 12/2007 |
| WO | 2010151761 A2 | 12/2010 |
| WO | 2010151761 A3 | 12/2010 |

OTHER PUBLICATIONS

European Patent Office, Int'l Extended Search Report for Appl. No. 19169914.9, dated Sep. 6, 2019.
Sakura Finetek U.S.A., Inc., Australia Application No. 2019202778, Examination Report No. 1, Mar. 30, 2020.

(Continued)

*Primary Examiner* — Jyoti Nagpaul
(74) *Attorney, Agent, or Firm* — William Thomas Babbitt (57) ABSTRACT

A specimen slide for holding tissue specimens, and a method of loading tissue specimens on the specimen slide are described. The specimen slide can be printed with control and patient information corresponding to respective control and patient tissue specimens mounted on the specimen slide. The control and patient information can be printed at different times. The control information may be printed before loading the control tissue specimen on the specimen slide, and the patient information can be printed after loading the control tissue specimen on the specimen slide. The control and patient information may be encoded in a first barcode and a second barcode, respectively. The barcodes can have different configurations, such as different barcode types or different orientations. Other embodiments are also described and claimed.

20 Claims, 4 Drawing Sheets

(56) References Cited

OTHER PUBLICATIONS

Sakura Finetek U.S.A., Inc., Canadian Application No. 3,039,391, Examiner's Report, May 21, 2020.
Sakura Finetek U.S.A., Inc., Japanese Application No. 2019-077478, Notice for Refusal, Jul. 22, 2020.

* cited by examiner

SPECIMEN SLIDE HAVING SEVERAL BARCODES

BACKGROUND

Field

Embodiments related to specimen slides for mounting biological material samples, are disclosed. More particularly, embodiments related to specimen slides for mounting several tissue specimens, are disclosed.

Background Information

Examination of tissue samples generally involves harvesting tissue from a patient. The tissue may be subsequently sliced into a block and transferred to a tissue cassette. The tissue block may be processed in the cassette, e.g., to replace water in the tissue with wax to facilitate subsequent sectioning. Sections of the tissue block can be mounted on a slide for examination.

In some cases, a control tissue section and a patient tissue section can be mounted on a same slide for interrogation of qualitative parameters like morphology, presence or absence of a biological response, expression level of a biological response, or a location of a biological response. The control tissue section may have a known biological response to downstream processes, e.g., may have known biomarkers, and can validate the efficacy of downstream processes directed to the patient tissue section. Information corresponding to the control tissue section and the patient tissue section may be handwritten on different surfaces, e.g., a front and back, of the slide to provide traceability of the tissue samples.

SUMMARY

A specimen slide for holding a control tissue specimen and a patient tissue specimen is described. In an embodiment, the specimen slide includes a specimen area to mount the control tissue specimen and the patient tissue specimen. The specimen slide also includes a printing area including a first barcode corresponding to the control tissue specimen, and a second barcode corresponding to the patient tissue specimen. The barcodes encode information about each of the respective tissue samples. For example, the first barcode can encode information about a tissue type of the control tissue specimen, and the second barcode can encode information about a tissue type of the patient tissue specimen. The barcodes can have different configurations to allow downstream equipment to distinguish between the first barcode and the second barcode. For example, the first barcode can be a one-dimensional barcode and the second barcode can be a two-dimensional barcode.

The specimen slide having differently configured barcodes that encode information for different tissue samples can improve traceability of the tissue samples and can reduce the likelihood that the control tissue specimen is not properly matched to the patient tissue specimen. The downstream equipment can include one or more barcode readers capable of reading the first barcode, e.g., the one-dimensional barcode, and/or the second barcode, e.g., the two-dimensional barcode. When the barcode reader(s) scan the one-dimensional barcode, the equipment can identify the encoded information as corresponding to the control tissue specimen. By contrast, when the barcode reader(s) scan the two-dimensional barcode, the equipment can identify the encoded information as corresponding to the patient tissue specimen. Accordingly, the equipment can determine the tissue type of the control tissue specimen prior to printing the second barcode and/or mounting a biologically similar patient tissue specimen having the same tissue type.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

DETAILED DESCRIPTION

Embodiments describe a specimen slide for holding specimens, and a method of loading specimens on the specimen slide. The specimen slide may be used to hold tissue specimens for tissue examination, as described below. The specimen slide, however, may be used in other applications, such as for holding cell lines or other biological materials for examination.

In various embodiments, description is made with reference to the figures. However, certain embodiments may be practiced without one or more of these specific details, or in combination with other known methods and configurations. In the following description, numerous specific details are set forth, such as specific configurations, dimensions, and processes, in order to provide a thorough understanding of the embodiments. In other instances, well-known processes and manufacturing techniques have not been described in particular detail in order to not unnecessarily obscure the description. Reference throughout this specification to "one embodiment," "an embodiment," or the like, means that a particular feature, structure, configuration, or characteristic described is included in at least one embodiment. Thus, the appearance of the phrase "one embodiment," "an embodiment," or the like, in various places throughout this specification are not necessarily referring to the same embodiment. Furthermore, the particular features, structures, configurations, or characteristics may be combined in any suitable manner in one or more embodiments.

The use of relative terms throughout the description may denote a relative position or direction. For example, "front surface" may indicate a first surface on a first side of a specimen slide. Similarly, "back surface" may indicate a second surface on a second side of the specimen slide, opposite of the first surface. Such terms are provided to establish relative frames of reference, however, and are not intended to limit the use or orientation of a specimen slide to a specific configuration described in the various embodiments below.

Currently, when several tissue samples are loaded onto a same slide for examination, information corresponding to the samples is handwritten onto the slide with a pencil. The slides are space-limited, however, and to fit the information the manual entry process requires that the information corresponding to each tissue sample be written on different surfaces of the slide. For example, information corresponding to a control tissue section is written on a front surface of the slide, and information corresponding to a patient tissue section is written on a back surface of the slide. The manual entry process limits an amount of information that can be included on the slide. The handwritten information is not machine readable, and thus, downstream processes cannot be automated based on the information. Also, the pencil-written information can be smeared or erased during loading of the tissue specimens or downstream handling.

In an aspect, a specimen slide can hold several tissue specimens, and may include several barcodes corresponding to respective specimens. The specimen slide can have a specimen area including a control specimen subarea to hold a control tissue specimen, and a patient specimen subarea to hold a patient tissue specimen. The specimen slide can have a printing area including a first printing subarea corresponding to the control specimen subarea, and a second printing subarea corresponding to the patient specimen subarea. The specimen area and the printing area can be on a same side of the specimen slide, e.g., a front surface. The printing area can include two machine readable barcodes indelibly printed and corresponding to respective tissue specimens. Each barcode can have a different configuration to allow a downstream barcode scanning process to determine a correspondence between the barcode and the matching specimen. For example, a first barcode can be a one-dimensional barcode corresponding to the control tissue specimen, and a second barcode can be a two-dimensional barcode corresponding to the patient tissue specimen. Accordingly, the specimen slide can allow for automation of downstream processes by making information for several specimens readable from a same surface. The barcodes can encode more information per unit area than is possible by handwriting. Also, the printed barcodes can be resistant to smearing or erasure to provide robust traceability of the tissue specimens.

Figure 1:
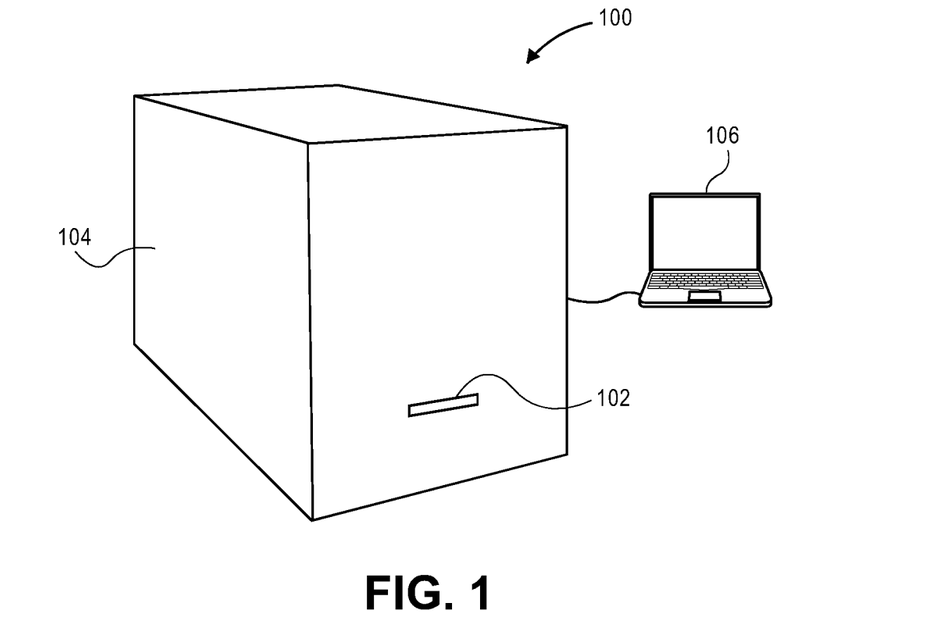
FIG. 1 is a perspective view of a slide printer, in accordance with an embodiment.

Referring to FIG. 1, a perspective view of a slide printer is shown in accordance with an embodiment. A slide printer 100 may be used to print information on a specimen slide. Slide printer 100 can include a printer head, e.g., an inkjet, thermal, or laser printer head, to print on a surface of the specimen slide. The printer head may use positive or negative printing techniques (adding or removing material from the surface) to mark the specimen slide. In an embodiment, the slide printer 100 includes a receiving slot 102 in a housing 104 to receive the specimen slide. A user may insert a printing area of the specimen slide into receiving slot 102 to be printed by the printer head within housing 104. The printer head may print directly on the printing area. For example, the printer head may print high-resolution one-dimensional or two-dimensional barcodes on the printing area.

Slide printer 100 may include a barcode reader (not shown) within housing 104, or external to housing 104. For example, the barcode reader may be a peripheral input device connected to a computer system 106. The barcode reader can include a light source and a light sensor to read barcodes printed on the specimen slide. In an embodiment, the barcode reader can read barcodes having different configurations. For example, the barcode reader can read one-dimensional and two-dimensional barcodes. Similarly, the barcode reader may read barcodes of a same type, e.g., two-dimensional barcodes, that are oriented differently on the specimen slide. Slide printer 100 may include several barcode readers configured to read respective barcodes, e.g., different barcode types, printed on the specimen slide.

Slide printer 100 may include slide handling components. In an embodiment, slide printer 100 includes a slide actuator (not shown) to receive and eject the specimen slide at receiving slot 102. The slide actuator may be a pulley system, a robotic gripper, etc., which may grasp and retract the specimen slide into housing 104, or may eject the specimen slide from receiving slot 102.

Slide printer 100 may include a standalone computer system within housing 104. The computer system can have a processing system, e.g., a processor, to control the slide printer 100 components to perform the methods described below. Alternatively, slide printer 100 may be controlled by a connected computer system 106, e.g., a desktop computer, to control the printing process.

Figure 2:
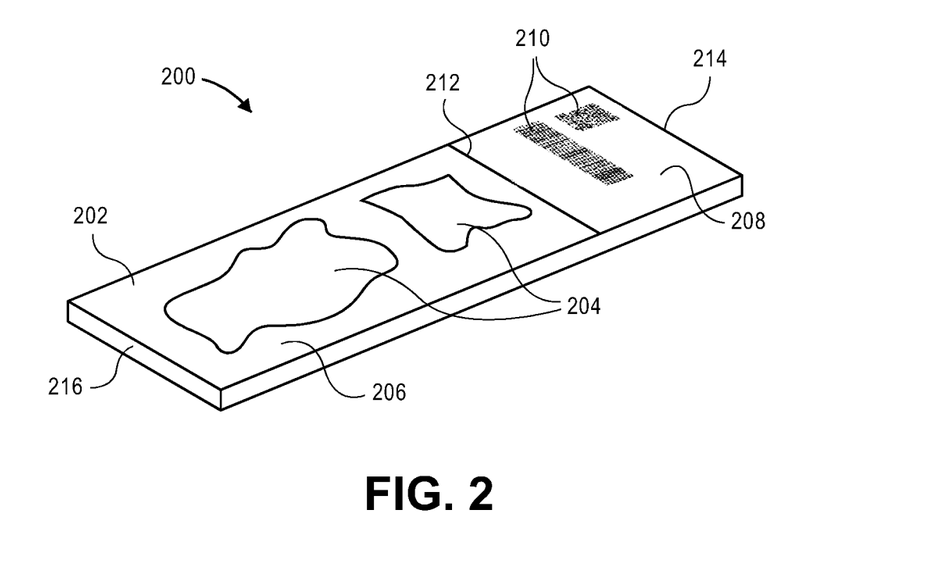
FIG. 2 is a perspective view of a specimen slide, in accordance with an embodiment.

Referring to FIG. 2, a perspective view of a specimen slide is shown in accordance with an embodiment. A specimen slide 200 can be a thin strip of material, e.g., glass, plastic, or any other suitable material, having a front surface 202 to receive one or more tissue specimens 204. Specimen slide 200 can include a specimen area 206 on front surface 202, and subareas of specimen area 206 may be predetermined locations for mounting a control tissue specimen or a patient tissue specimen, as described below. Specimen slide 200 can have a rectangular profile, or a different profile shape. In an embodiment, a width and length of specimen slide 200 are both greater than a thickness of the slide.

Specimen slide 200 may include a printing area 208 for printing one or more barcodes 210 on front surface 202. Printing area 208 may be separated from specimen area 206 by a divider 212. Divider 212 may be a datum located between a first end 214 of specimen slide 200 and an opposite second end 216 of specimen slide 200. Divider 212 can be a datum visually designating a transition between printing area 208 and specimen area 206. Divider 212 may, but need not be, a transverse dividing line extending parallel to the slide edges at first end 214 and second end 216, and between lateral side edges of the slide. In an embodiment, divider 212 is a transition between a frosted area of specimen slide 200 and a non-frosted area of specimen slide 200. For example, printing area 208 may be an etched and visually opaque or translucent (frosted) portion of front surface 202, and specimen area 206 may be a smooth and visually transparent (non-frosted) portion of front surface 202. The boundary between the frosted and non-frosted portions can be recognized as divider 212.

Figure 3A:
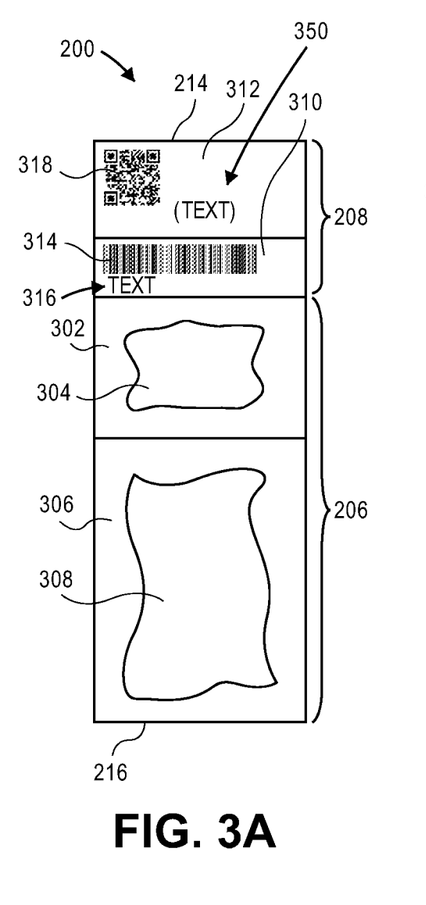
FIGS. 3A-3C are plan views of specimen slides, in accordance with various embodiments.

Referring to FIG. 3A, a plan view of a specimen slide is shown in accordance with an embodiment. Specimen area 206 and printing area 208 of front surface 202 can be further subdivided into control and patient subareas. In an embodiment, specimen area 206 includes a control specimen subarea 302 to hold a control tissue specimen 304, and a patient specimen subarea 306 to hold a patient tissue specimen 308. Control tissue specimen 304 can be mounted on control specimen subarea 302, and patient tissue specimen 308 can be mounted on patient specimen subarea 306. In an embodiment, control specimen subarea 302 can have a smaller surface area than patient specimen subarea 306. For example, control specimen subarea 302 may have a rectangular subarea that is less than two thirds of a rectangular surface area of patient specimen subarea 306.

In an embodiment, control specimen subarea 302 is between patient specimen subarea 306 and printing area 208. Placement of control specimen subarea 302 nearer to first end 214 of specimen slide 200 can allow control tissue specimen 304 to be undisturbed during placement of patient tissue specimen 308. More particularly, control tissue specimen 304 may be mounted on control specimen subarea 302 before mounting patient tissue specimen 308 on patient specimen subarea 306. Second end 216 of specimen slide 200 may be lowered into a water bath to mount patient tissue specimen 308, and thus, locating patient specimen subarea 306 between second end 216 and control specimen subarea 302 can allow control tissue specimen 304 to remain outside of the water bath during the mounting process.

Printing area 208 of specimen slide 200 may also be subdivided into regions respectively corresponding to control tissue specimen 304 and patient tissue specimen 308. In an embodiment, printing area 208 includes a first printing subarea 310 and a second printing subarea 312. Each printing subarea can include one or more machine readable or human readable markings. For example, first printing subarea 310 may include a first barcode 314, which is a machine readable marking. Similarly, first printing subarea 310 may include a human readable text string 316, which is a human readable marking. Second printing subarea 312 may include comparable markings, e.g., a second barcode 318.

Barcodes 210 on specimen slide 200 can encode information related to the tissue mounting subareas, and more particularly, to the tissue specimens 204 mounted (or to be mounted) on the subareas. For example, first barcode 314 can encode information corresponding to control specimen subarea 302, or control tissue specimen 304. Similarly, second barcode 318 can encode information corresponding to patient specimen subarea 306, or patient tissue specimen 308. The information encoded in each barcode may be the same, different, or partially the same and partially different. By way of example, first barcode 314 can encode information about a type of tissue or cell line making up control tissue specimen 304, e.g., breast or colon tissue having a predetermined antigen level. That is, control tissue specimen 304 can have a first tissue type, and first barcode 314 can encode information corresponding to the first tissue type. First barcode 314 may encode information identifying a tissue block from which control tissue specimen 304 is sectioned. Second barcode 318 can encode information about a type of tissue making up patient tissue specimen 308. That is, patient tissue specimen 308 can have a second tissue type, and second barcode 318 can encode information corresponding to second tissue type. Second barcode 318 may encode information identifying a tissue block from which patient tissue specimen 308 is sectioned. The first tissue type and the second tissue type may match, but control tissue specimen 304 may be sectioned from a different tissue block than patient tissue specimen 308.

The information encoded in first barcode 314 can differ, at least in part, from the information encoded in second barcode 318. For example, in addition to a tissue type and tissue block identifier of patient tissue specimen 308, second barcode 318 can encode an accession number corresponding to a patient identifier or specimen source of patient tissue specimen 308, a unique identifier for a lab that processed patient tissue specimen 308, a unique identifier for a container or cassette used to transport patient tissue specimen 308, etc. Barcodes 210 can encode hundreds of bytes of data depending on their size, and thus, first barcode 314 and second barcode 318 may encode a range of different data types. Information that may be encoded in one or more of first barcode 314 or second barcode 318 includes a manufacturing date, a list of biomarkers that the tissue samples may be used for, or other data.

The human readable markings on first printing subarea 310 or second printing subarea 312 may include a subset of the information included in the barcode that is located in the same subarea. For example, first barcode 314 may encode information about a tissue type of control tissue specimen 304, e.g., prostate tissue, and human readable text string 316 may read "prostate." Accordingly, a user may, at a glance, determine whether an appropriate specimen slide 200 is being used when mounting a prostate tissue specimen in the patient specimen subarea 306.

Barcodes 210 in printing area 208 may be configured to allow scanning equipment to distinguish between first barcode 314 and second barcode 318. More particularly, first barcode 314 can have a first configuration and second barcode 318 can have a second configuration different than the first configuration. The barcode configurations can include a barcode type and/or a barcode orientation. At least one of the type or the orientation of the barcodes 210 can differ.

In an embodiment, first barcode 314 and second barcode 318 have a different barcode type and a same barcode orientation. By way of example, first barcode 314 can have a first barcode type, e.g., a one-dimensional barcode, and second barcode 318 can have a second barcode 318 type that is different than the first barcode type, e.g., a two-dimensional barcode. First barcode 314 can be recognizable as a horizontally-oriented one-dimensional barcode by barcode scanning equipment, and second barcode 318 may be recognizable as a horizontally oriented two-dimensional barcode by barcode scanning equipment. Alternatively, first barcode 314 can be a two-dimensional barcode and second barcode 318 can be a one-dimensional barcode.

The one-dimensional barcode is a barcode type, and encompasses any of several different one-dimensional barcode subtypes. For example, the one-dimensional barcode can be a linear barcode having a discrete or continuous symbology and any number of different bar widths. Examples include the Codabar linear barcode symbology. Similarly, the two-dimensional barcode is a barcode type, and encompasses any of several different two-dimensional barcode subtypes. For example, the two-dimensional barcode can be a matrix code, such as a QR code.

Figure 3B:
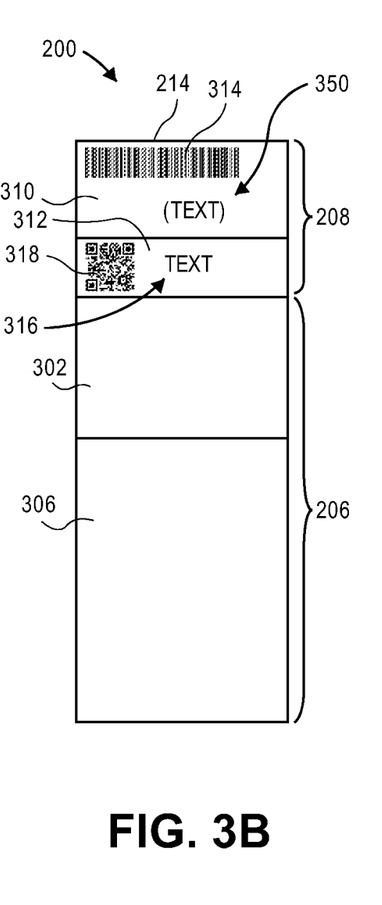

Referring to FIG. 3B, a plan view of a specimen slide is shown in accordance with an embodiment. Printing subareas can be located at different positions on printing area 208. In an embodiment, first printing subarea 310 can be nearer to first end 214 than second printing subarea 312. First barcode 314 can be nearer to first end 214 than second barcode 318. Barcodes 210 may be printed on printing area 208 at axially adjacent locations as shown in FIGS. 3A-3B. Alternatively, first barcode 314 and second barcode 318 may be positioned laterally adjacent to each other on printing area 208. For example, barcodes 210 may be located side-by-side on printing area 208, as shown in FIG. 3C.

Figure 3C:
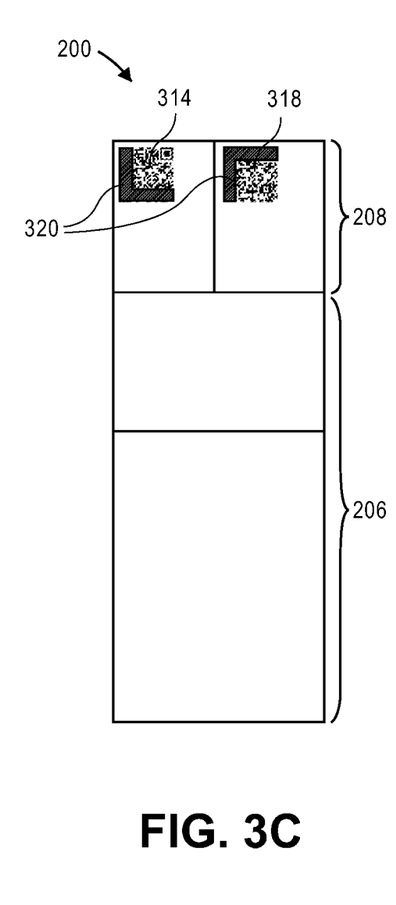

Referring to FIG. 3C, a plan view of a specimen slide is shown in accordance with an embodiment. In an embodiment, first barcode 314 and second barcode 318 have a same barcode type and a different barcode orientation. First barcode 314 can be located laterally adjacent to second barcode 318. Alternatively, first barcode 314 can be axially above or below second barcode 318 as shown in FIGS. 3A-3B. The barcodes 210 can both be two-dimensional barcodes, and may be oriented differently. More particularly, each barcode may have an orientation datum 320, e.g., an L-shaped datum, to indicate to a barcode scanner an appropriate orientation for scanning the barcode data.

In an embodiment, first barcode 314 can have a first orientation as indicated by a rotational position of orientation datum 320. For example, orientation datum 320 of first barcode 314 may be zero degrees with respect to a predetermined direction, e.g., an axial direction extending between first end 214 and second end 216. By contrast, second barcode 318 can have a second orientation as indicated by a rotational position of orientation datum 320. Orientation datum 320 of second barcode 318 may be 90 degrees with respect to the predetermined direction. Accordingly, although first barcode 314 and second barcode 318 may both be two-dimensional barcodes, a barcode scanner may distinguish the barcodes based on the predetermined rotational orientation. That is, the barcode having orientation datum 320 at zero degrees with respect to the predetermined direction may be ascertained as corresponding to control tissue specimen 304, and the barcode having orientation datum 320 at 90 degrees with respect to the predetermined direction may be ascertained as corresponding to patient tissue specimen 308.

Figure 4:
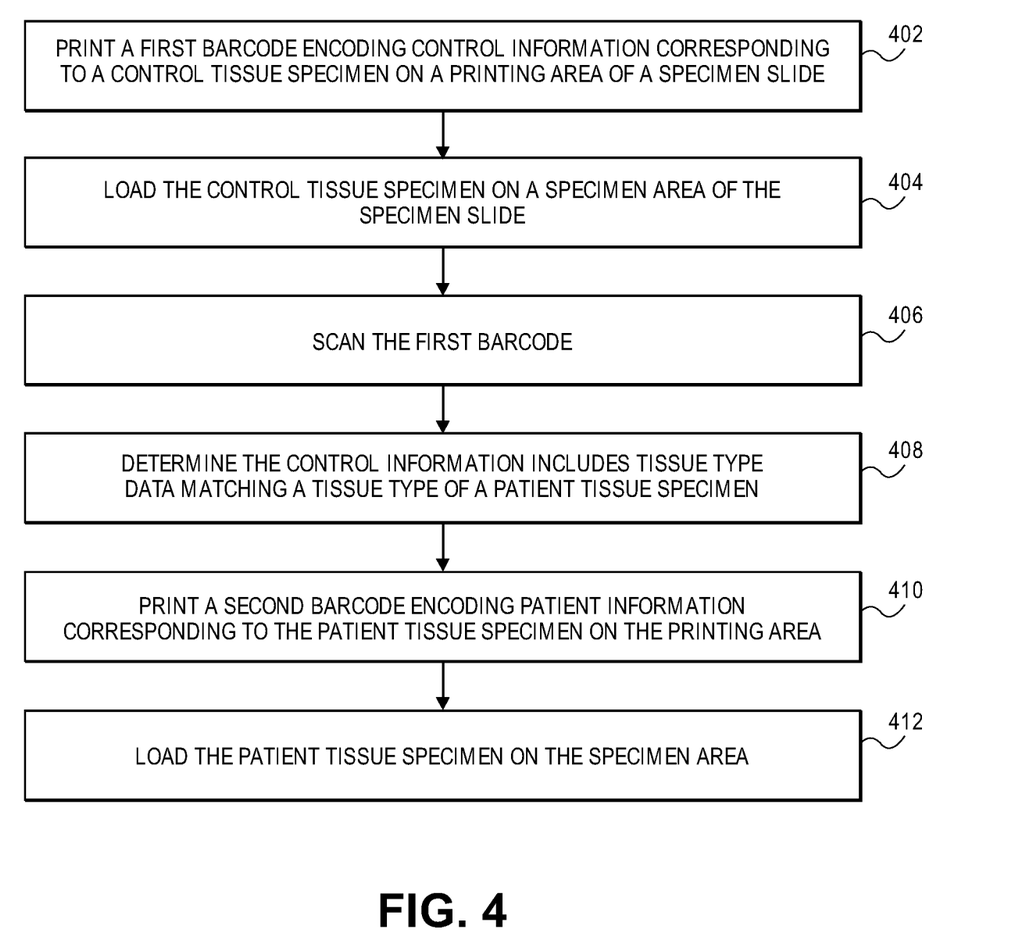
FIG. 4 is a flowchart of a method of loading tissue specimens on a specimen slide, in accordance with an embodiment.

Referring to FIG. 4, a flowchart of a method of loading tissue specimens on a specimen slide is shown in accordance with an embodiment. The method can print barcodes 210 directly on specimen slide 200 at different times without altering the printed information or disturbing the loaded specimens. For example, the control barcode can be printed on specimen slide 200 at a first time when control tissue specimen 304 is mounted on specimen area 206, and the patient barcode can be printed on specimen slide 200 afterward when patient tissue specimen 308 is mounted on specimen area 206. Although the patient barcode may be printed after control tissue specimen 304 is already loaded on specimen slide 200, the printing may be performed without affecting the loaded tissue.

Tissue specimens 204 may be prepared separately from the printing operations. For example, a tissue block, either a control block or a patient block, may be sectioned to provide control tissue specimen 304 and/or patient tissue specimen 308. Control tissue specimen 304 and patient tissue specimen 308 may be prepared at different times, e.g., days apart, and in different operations, e.g., at different facilities.

At operation 402, first barcode 314 is printed on printing area 208 of specimen slide 200. First barcode 314 can encode control information corresponding to control tissue specimen 304. The control information may be entered into computer system 106 by a user. Slide printer 100 may be controlled by computer system 106, and thus, the control information may be encoded in a barcode format that is printed onto specimen slide 200 by the printer head. In an embodiment, printing area 208 of specimen slide 200, e.g., the frosted area, may be inserted into receiving slot 102. The slide actuator can grasp and move specimen slide 200 to locate first printing subarea 310 below printer head for printing. The printer head prints first barcode 314 on first printing subarea 310 in a first configuration, e.g., as a one-dimensional barcode. Printer head may also print human readable text on printing area 208 adjacent to first barcode 314. After printing first barcode 314, the slide actuator may eject specimen slide 200 from slide printer 100.

At operation 404, control tissue specimen 304 is loaded on specimen area 302 of specimen slide 200. Control tissue specimen 304 may be selected based on the printed control information. The control information may indicate a particular tissue type. For example, first barcode 314 and human readable text 316 may indicate that the control type is breast tissue having a predetermined response to a staining process. Accordingly, the user may obtain a breast tissue control specimen and load the specimen on control specimen subarea 302.

First barcode 314 may be printed before loading control tissue specimen 304 as described above. Alternatively, control tissue specimen 304 may first be loaded onto specimen slide 200, and specimen slide 200 may then be printed with first barcode 314. After loading control tissue specimen 304 onto specimen area 206, specimen slide 200 is a preloaded control slide. The control preloaded control slide can be stored for future use. For example, the preloaded control slide can be placed in a container and sent to another facility to be used with patient tissue specimen 308 at a later date, e.g., several days later.

At operation 406, in preparation for printing second barcode 318 on specimen slide 200, first barcode 314 may be scanned. To scan first barcode 314, the preloaded control slide can be inserted into receiving slot 102 of slide printer 100. More particularly, printing area 208 may be inserted into receiving slot 102 without disturbing the non-frosted area of specimen slide 200. That is, the biological material mounted on specimen slide 200 may not be touched when printing area 208 is inserted into slide printer 100. The slide actuator of slide printer 100 can grip and move specimen slide 200 to position first barcode 314 under the barcode reader.

At operation 408, slide printer 100 can determine the control information encoded in first barcode 314. The barcode reader can scan first barcode 314, and computer system 106 can decode the scanned barcode to obtain information corresponding to control tissue specimen 304. The information may be encoded directly in first barcode 314. Alternatively, first barcode 314 can encode reference information that computer system 106 uses to access and/or retrieve information stored in a data structure on a memory of computer system 106, or a remote data processing system, e.g., a server. The control information may include tissue type data corresponding to control tissue specimen 304. As a quality check, computer system 106 may determine that the tissue type data matches a tissue type data of patient tissue specimen 308 that is to be mounted on specimen slide 200. For example, the computer system may verify that the preloaded control slide includes breast tissue and that patient tissue specimen 308 is of the same type of breast tissue, or the biological response of the control tissue is adequate to establish that the biological response of the patient tissue performed downstream in a process is valid if the biological response of the control tissue within the same process is correct.

At operation 410, second barcode 318 can be printed on printing area 208. Printing of second barcode 318 (FIG. 3A) may be in response to determining that the tissue type data corresponding to control tissue specimen 304 matches the tissue type of patient tissue specimen 308. More particularly, when the computer system determines that the tissue types match, second printing subarea 312 may be moved under the printer head for printing. Alternatively, if the computer system determined that the tissue types do not match, the slide actuator may eject specimen slide 200 and a notification may be displayed to the user indicating that a different preloaded control slide is needed.

Second barcode 318 can encode patient information corresponding to patient tissue specimen 308. The patient information may be entered into computer system 106 by a user. Slide printer 100 may be controlled by computer system 106, and thus, the patient information may be encoded in a barcode format that is printed onto specimen slide 200 by the printer head. Printer head prints second barcode 318 on second printing subarea 312 in a second configuration, e.g., different than the first configuration used to print first barcode 314. Second barcode 318 can be printed without disturbing first barcode 314 or control tissue specimen 304. The second configuration may be different than the first configuration of first barcode 314, as described above. The printer head may optionally also print human readable text 350 on printing area 208 adjacent to second barcode 318. After printing, specimen slide 200 may be ejected from slide printer 100 by the slide actuator.

Printing of second barcode 318 may occur after loading of control tissue specimen 304, as described above. However, both barcodes 210 may be printed before loading tissue specimens 204 on specimen slide 200. Similarly, printing of barcodes 210 may occur at a same or different workstation, e.g., a same or different slide printer 100, even though barcodes 210 are printed at different times.

At operation 412, patient tissue specimen 308 can be loaded on specimen area 206. Patient tissue specimen 308 can correspond to the patient information encoded in second barcode 318. Prior to mounting patient tissue specimen 308, the user can read human readable text 316 on printing area 208 that indicates a same tissue type that was confirmed prior to printing second barcode 318. For example, the user may read "breast," and know that breast tissue can be mounted on specimen area 206. Accordingly, the method described above provides verification of matching control and patient tissue specimens 308 at both the printing stage and the tissue mounting stage. As such, the method improves the traceability of specimen loaded slides and reduces a likelihood that an incorrect preloaded control slide will be used to examine a patient tissue sample. The reduced likelihood of mistake can reduce the associated costs of rework.

Figure 5:
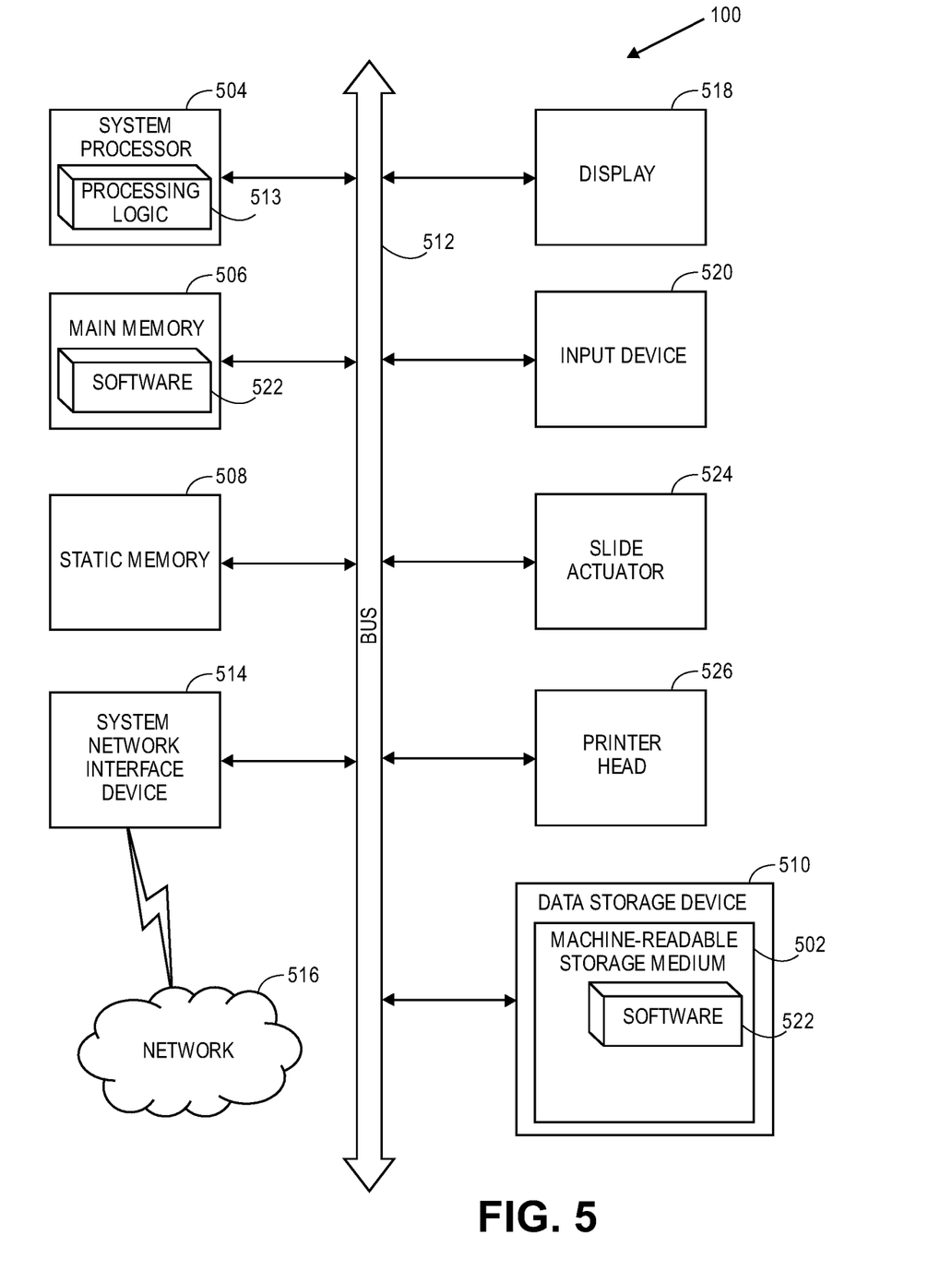
FIG. 5 is a block diagram of a slide printer, in accordance with an embodiment.

Referring to FIG. 5, a block diagram of a slide printer is shown in accordance with an embodiment. The components of slide printer 100 include computer system components and slide handling components. For example, the computer system components may be coupled to and control the slide actuator, the barcode reader, the printer head, etc. The computer system may also receive and analyze information provided by sensors or input devices, e.g., the barcode reader.

Computer system 106 of slide printer 100 may be connected (e.g., networked) to other machines or systems in a Local Area Network (LAN), an intranet, an extranet, or the Internet. For example, computer system 106 may be networked with a laboratory information system (LIS) in a hospital. Computer system 106 may operate in the capacity of a server or a client machine in a client-server network environment, or as a peer machine in a peer-to-peer (or distributed) network environment. Computer system 106 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated for the computer system, the term "machine" shall also be taken to include any collection of machines (e.g., computers) that individually or jointly execute a set (or multiple sets) of instructions to perform any one or more of the methodologies described herein.

Computer system 106 may include a non-transitory machine readable and/or machine accessible storage medium storing instructions, which may be used to program computer system (or other electronic devices) to perform a method according to embodiments. A machine readable medium 502 includes any mechanism for storing or transmitting information in a form readable by a machine (e.g., a computer). For example, machine readable (e.g., computer readable) medium 502 includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., infrared signals, digital signals, etc.)), etc.

In an embodiment, the computer system includes a processing system 504, e.g., a system processor, a main memory 506 (e.g., read-only memory (ROM), flash memory, dynamic random access memory (DRAM) such as synchronous DRAM (SDRAM) or Rambus DRAM (RDRAM), etc.), a static memory 508 (e.g., flash memory, static random access memory (SRAM), etc.), and a secondary memory (e.g., a data storage device 510), which communicate with each other via a bus 512.

Processing system 504 represents one or more general-purpose processing devices such as a microsystem processor, central processing unit, or the like. More particularly, the system processor may be a complex instruction set computing (CISC) microsystem processor, reduced instruction set computing (RISC) microsystem processor, very long instruction word (VLIW) microsystem processor, a system processor implementing other instruction sets, or system processors implementing a combination of instruction sets. Processing system 504 may also be one or more special-purpose processing devices such as an application specific integrated circuit (ASIC), a field programmable gate array (FPGA), a digital signal system processor (DSP), network system processor, or the like. Processing system 504 is configured to execute processing logic 513 for performing the operations described herein.

Computer system 106 may further include a system network interface device 514 for communicating with other machines or systems, e.g., an LIS, over a network 516. The computer system may also include one or more output devices, such as a display unit 518 (e.g., a video display such as a liquid crystal display (LCD), a light emitting diode display (LED), or a cathode ray tube (CRT)). Display unit 518 can present a graphical user interface to a user. Computer system 106 can include an input device 520 (e.g., an alphanumeric input device such as a keyboard). Input device 520 can be any device that receives an input from an external source, e.g., from a user or an object. For example, input device 520 can be the barcode reader used to scan first barcode 314 and/or second barcode 318, an RFID scanner, or a microphone. Computer system 106 may include other input devices 520, such as a cursor control device (e.g., a mouse), and other output devices, such as a signal generation device (e.g., a speaker).

The sets of instructions described above, e.g., software 522, can be stored on data storage device 510. Software 522 can embody any one or more of the methodologies or functions described herein. Software 522 may also reside, completely or at least partially, within main memory 506 and/or within processing system 504 during execution thereof by the computer system, main memory 506 and the system processor also constituting machine readable storage media. Software 522 may further be transmitted or received over network 516 via system network interface device 514.

While the machine-accessible storage medium is shown in an exemplary embodiment to be a single medium, the term "machine readable storage medium" should be taken to include a single medium or multiple media (e.g., a centralized or distributed database, and/or associated caches and servers) that store the one or more sets of instructions. The term "machine readable storage medium" shall also be taken to include any medium that is capable of storing or encoding a set of instructions for execution by the machine and that cause the machine to perform any one or more of the methodologies. The term "machine readable storage medium" shall accordingly be taken to include, but not be limited to, solid-state memories, and optical and magnetic media.

Slide printer 100 can include the slide actuator 524 and the printer head 526 under the control of computer system 106 to perform the operations described above. More particularly, processing system 504 can execute instructions of software 522 to cause slide actuator 524 to retract or eject specimen slide 200, or cause printer head 526 to print first barcode 314, second barcode 318, or human readable text 316 (and optionally 350) on printing area 208 of specimen slide 200.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A specimen slide, comprising:
a specimen area on a front surface of the slide, wherein the specimen area includes a control specimen subarea and a patient specimen subarea; and
a printing area on the front surface of the slide,
wherein the printing area includes a first barcode having a first configuration that is at least one of a bar code type and an orientation on the slide, and a second barcode having a second configuration that is at least one of a bar code type and an orientation on the slide and the second configuration is different than the first configuration,
wherein the specimen area and the printing area are arranged so that one of the control specimen subarea and the patient specimen subarea separate the printing area from the other of the control specimen subarea and the patient specimen subarea.

2. The specimen slide of claim 1, wherein the first barcode encodes information corresponding to the control specimen subarea, wherein the second barcode encodes information corresponding to the patient specimen subarea, and wherein the printing area includes a human readable text string corresponding to one or more of the control specimen subarea or the patient specimen subarea.

3. The specimen slide of claim 2, wherein the first configuration includes a first barcode type, wherein the second configuration includes a second barcode type.

4. The specimen slide of claim 3, wherein the first barcode type and the second barcode type are different barcode types selected from the group consisting of a one-dimensional barcode and a two-dimensional barcode.

5. The specimen slide of claim 3, wherein the first barcode type and the second barcode type are same barcode types, and wherein the first barcode has a first orientation different than a second orientation of the second barcode.

6. The specimen slide of claim 2, wherein the information encoded in the first barcode differs from the information encoded in the second barcode.

7. The specimen slide of claim 2, further comprising a control tissue specimen mounted on the control specimen subarea.

8. The specimen slide of claim 7, wherein the information encoded in the first barcode corresponds to a first tissue type of the control tissue specimen, and wherein the information encoded in the second barcode corresponds to a second tissue type.

9. The specimen slide of claim 1, wherein the control specimen subarea is between the patient specimen subarea and the printing area.

10. A method, comprising:
printing a first barcode on a printing area of a specimen slide, wherein the first barcode has a first configuration that is at least one of a bar code type and an orientation on the slide and the first bar code encodes control information;
loading a control tissue specimen on a specimen area of the specimen slide, wherein the control information corresponds to the control tissue specimen; and
printing a second barcode on the printing area, wherein the second barcode has a second configuration that is at least one of a bar code type and an orientation on the slide and the second configuration is different than the first configuration, wherein the second barcode encodes patient information corresponding to a patient tissue specimen that is different than the control tissue specimen.

11. The method of claim 10, further comprising printing human readable text on the printing area.

12. The method of claim 10, wherein printing the first barcode is before loading the control tissue specimen, and wherein printing the second barcode is after loading the control tissue specimen.

13. The method of claim 10, further comprising loading a patient tissue specimen on the specimen area.

14. The method of claim 13, further comprising determining the control information includes tissue type data matching a tissue type of the patient tissue specimen, wherein printing the second barcode is in response to determining the tissue type data matches the tissue type.

15. The method of claim 14, wherein determining the tissue type data matches the tissue type includes scanning the first barcode.

16. A non-transitory machine readable medium storing instructions, which when executed by a processor of a slide printer, cause the slide printer to perform a method comprising:
printing, by a printer head of the slide printer, a first barcode on a printing area of a specimen slide, wherein the first barcode has a first configuration that is at least one of a bar code type and an orientation on the slide and the first bar code encodes control information corresponding to a control tissue specimen; and
printing, by the printer head of the slide printer, a second barcode on the printing area, wherein the second barcode has a second configuration that is at least one of a bar code type and an orientation on the slide and the second configuration is different than the first configuration and encodes patient information corresponding to a patient tissue specimen.

17. The non-transitory machine readable medium of claim 16, wherein the method includes printing, by the printer head, human readable text on the printing area.

18. The non-transitory machine readable medium of claim 16, wherein the method includes determining, by the processor of the slide printer, the control tissue specimen and the patient tissue specimen have matching tissue types, and wherein printing the second barcode is in response to determining the matching tissue types.

19. The non-transitory machine readable medium of claim 18, wherein determining the matching tissue types includes scanning, by a barcode reader of the slide printer, the first barcode.

20. The non-transitory machine readable medium of claim 16, wherein the method includes ejecting, by a slide actuator of the slide printer, the specimen slide after printing the first barcode and before printing the second barcode.

* * * * *